Figure 1:
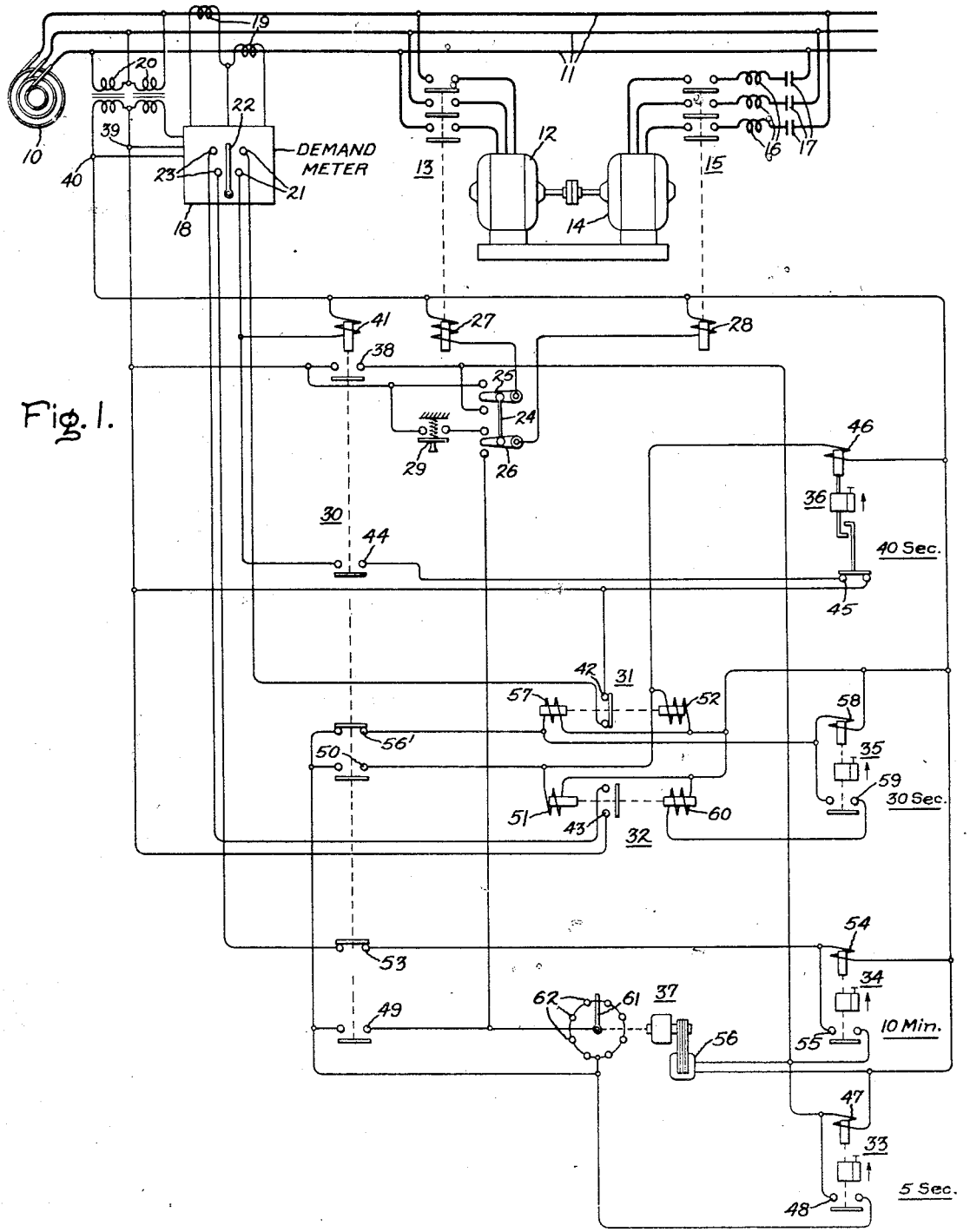

Sept. 29, 1942.  J. L. WOODWORTH  2,297,380
CARRIER CURRENT CONTROL SYSTEM
Filed Aug. 13, 1941  2 Sheets-Sheet 1

Inventor:
John L. Woodworth,
by Harry E. Dunham
His Attorney.

Sept. 29, 1942.    J. L. WOODWORTH    2,297,380
CARRIER CURRENT CONTROL SYSTEM
Filed Aug. 13, 1941    2 Sheets-Sheet 2

Inventor:
John L. Woodworth,
by *Harry E. Dunham*
His Attorney.

Patented Sept. 29, 1942

2,297,380

UNITED STATES PATENT OFFICE 2,297,380

CARRIER CURRENT CONTROL SYSTEM

John L. Woodworth, Schenectady, N. Y., assignor to General Electric Company, a corporation of New York Application August 13, 1941, Serial No. 406,588

15 Claims. (Cl. 171—97)

This invention relates to carrier current control systems, and more particularly to such systems in which the carrier current is utilized to effect control of loads on a power system at remote points.

Carrier current control systems for controlling loads on a power system at remote points generally utilize carrier current receivers at such remote loads which respond to carrier current only after they have received such carrier current for a substantial length of time. It is desirable to provide that such carrier current receivers shall not respond instantaneously to carrier current, in order to avoid possible response to transients induced on the power line by lightning, switching operations, and the like. Although, in manufacturing such carrier current receivers which respond to carrier current only after a substantial time, efforts are made to manufacture all such receivers alike, it is inevitable that certain manufacturing tolerances exist. Each carrier current receiver consequently responds to reception of carrier current for a slightly different time.

Such receivers generally operate in response to application of line voltage for an interval of time, and, since line voltages vary considerably in different parts for normal power systems due to loading conditions and the like, the receivers respond to carrier current pulses of different duration because they are energized by voltage of different intensities.

For such reasons, carrier current receivers of the type which respond only to reception of carrier current for a substantial interval generally vary in their time of response to such carrier current by considerable amounts. For example, one type of carrier current receiver used extensively to control water heater loads has a thermal element to which heat is applied during reception of carrier current. These carrier current controllers are manufactured so as to close the load circuit after receiving carrier current nominally for ten seconds. Actually, such controllers are manufactured to energize their associated load circuits after about 4 or 5 seconds. The time varies slightly due to manufacturing variations. As installed, these controllers are energized by line voltages of different values, and sometimes act to complete their associated load circuits in a period as short as three seconds. Others may require as long as six seconds before they complete their associated load circuits.

A typical carrier current receiver, of the type described above, is described and claimed in U. S. Letters Patent 2,064,644, for Control device, issued to me on December 15, 1936, and assigned to the same assignee as the present application. This receiver is described hereinafter in connection with the description and explanation of the operation of my invention.

Another such carrier current controller is disclosed and claimed in my copending application for Letters Patent, Serial No. 385,278, for Carrier current controller, filed on March 26, 1941, and assigned to the same assignee as the present application.

Briefly, this device comprises a bimetallic strip fixed at one end to a support, and at the other end to a second bimetallic strip arranged to bend in the opposite direction in response to heating. A movable electric circuit contact is mounted on the end of this second bimetallic strip and is arranged to engage a fixed electric circuit contact upon motion of the second bimetallic strip caused by heating. An electrical heating winding is arranged around the second bimetallic strip so that upon application of electric energy to the heater for a short period, the second bimetallic strip flexes to close the electric contacts, while the first bimetallic strip does not bend substantially. If heating be continued longer, heat flows from the second bimetallic strip to the first by conduction, or otherwise, and causes the first bimetallic strip to flex. Flexure of this first bimetallic strip is sufficient to separate the electrical contacts even though the second bimetallic strip is bent to a very large extent.

Offpeak load control by using such receivers is now accomplished by transmitting a carrier current impulse of sufficient duration to cause every receiver to operate. Such operation connects the associated loads to the power line at any desired time after the peak load for a day has decreased by a suitable amount. Such a carrier current impulse is usually transmitted to add water heater loads to a power system after the evening peak load has passed.

Just before a peak load is expected on the system, which normally occurs at some time in the middle of the day, another differently characterized carrier current impulse is transmitted to these receivers and this impulse causes them to disconnect their associated loads from the power line. In the case of the particular receivers described and claimed in the above mentioned patent and application, this impulse which produces disconnection of the load is usually about 30 seconds in length.

It is, therefore, usual that the carrier current controllers will be so actuated as to keep their associated loads connected to the power line for a large portion of each day, usually from 16 to 20 hours. These loads are disconnected by the carrier current receivers for a period, usually four to eight hours, during that portion of the day when the peak loads on the power system occur.

Transmission of a carrier current impulse which causes loads to be disconnected from the lower lines, in the case of loads such as water heaters which are thermostatically controlled, does not cause a sudden disconnection of a large total load from the power system. This is true because such loads have generally been energized for a considerable period of time, during which many such loads have been disconnected from the power system by their individual thermostatic control. However, during the period when such loads are all disconnected from the power system by carrier control, practically all of the associated thermostat controls connect the loads to the power line, except for their disconnection by the carrier current receivers. When a carrier current impulse is transmitted to connect all such loads to the power system therefore, the entire carrier current controlled load is applied to the power system at one time.

It is accordingly an object of my invention to provide an improved and simplified carrier current control system having means whereby small increments of the carrier current controlled loads may be added to the power system as desired.

It is a further object of my invention to provide an improved and simplified carrier current control system for controlling remote loads on a power system having means whereby the carrier current controlled loads may be so controlled as to maintain the power system load substantially constant except when the total system load increases beyond the point at which all carrier current controlled loads are disconnected or when the total system load decreases beyond the point where all the carrier current controlled loads are connected. It is a corollary object of my invention to provide simple and effective means whereby such control is automatically effected in response to power demands on the system.

It is also an object of my invention to provide an improved and simplified carrier current control system having means utilizing only one control frequency whereby a plurality of remote loads may be connected and disconnected from the power system consecutively as desired in response to carrier current of such one frequency.

Figure 2:
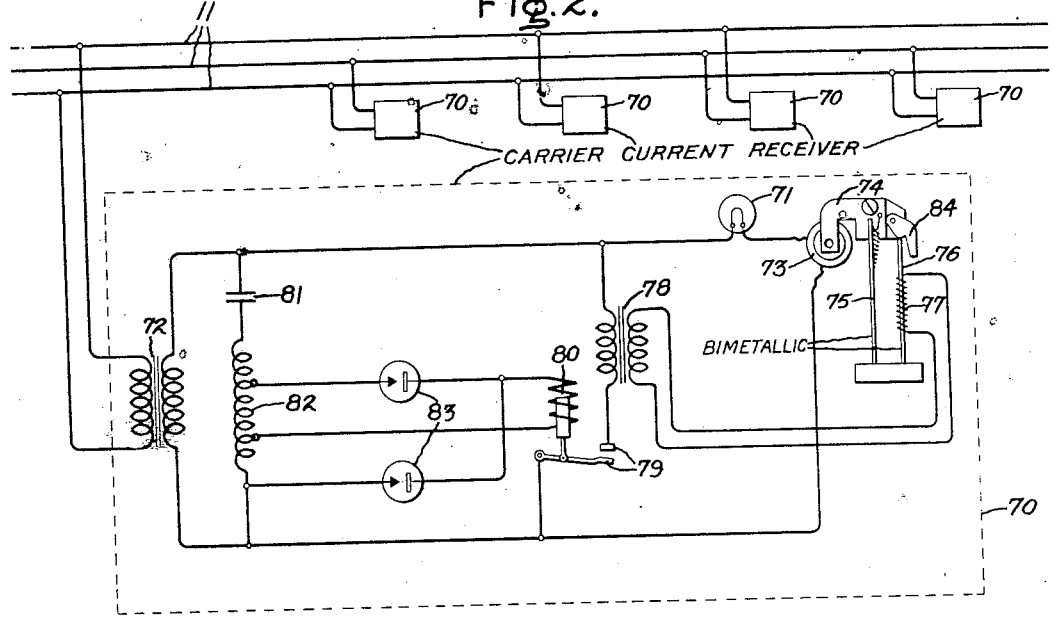
Figure 3:
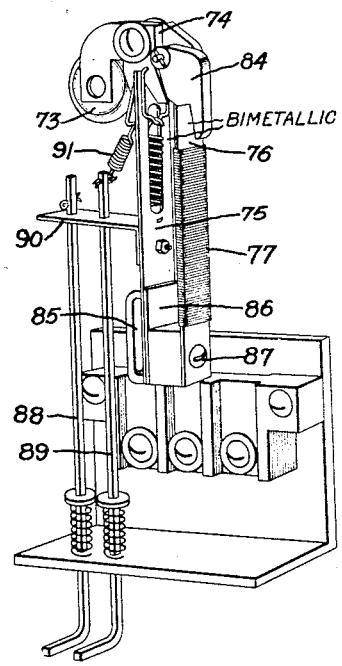

The features of my invention which I believe to be novel are set forth with particularity in the appended claims. My invention itself, both as to its organization and manner of operation, together with further objects and advantages thereof may best be understood by reference to the following description taken in connection with the accompanying drawings in which Fig. 1 illustrates a carrier current control transmitter connected with a power transmission system according to my invention; Fig. 2 illustrates carrier current control receivers and associated loads connected with a power transmission system, and Fig. 3 illustrates a thermal relay as illustrated in Fig. 2.

In Fig. 1 a generator, or other alternating current power source, is represented by three slip rings and associated brushes 10 to which a power line 11 is connected. Various loads, not shown, are connected to the power line 11, and certain ones of these loads are controlled by carrier current control receivers such, for example, as disclosed and claimed in my aforesaid patent and application and described hereinafter. These carrier current controlled loads, not shown, may comprise water heaters having thermostatic control, street lighting loads, or any other load which it may be desired to control from a remote point by carrier current.

A motor generator set is provided to produce suitable carrier currents and includes a motor 12 arranged to be energized from the power line 11 through a circuit breaker 13, and a generator 14. The generator 14 produces alternating voltage of carrier frequency, suitable for energizing the power line 11 so as to operate the carrier current control receivers connected thereto. This frequency may be of the order of 400 to 1000 cycles. The generator is connected to the power line 11 serially through a circuit breaker 15, carrier current coupling inductances 16, and capacitors 17. The capacitors 17 are provided to insulate the generator 14 from power currents in the power line 11, and the inductances 16 are provided to resonate with the coupling capacitors 17 at the carrier current frequency, so that very little reactance is presented to carrier current between the generator 14 and the power line 11.

In operation, closing of the circuit breaker 13 starts the motor 12, and subsequent closing of the circuit breaker 15 energizes the power line 11 with carrier current from the generator 14. If the circuit breaker 15 be kept closed for ten seconds, assuming that carrier current control receivers are utilized which have characteristics as described above, all such receivers connect their associated loads to the power line 11. If, however, the circuit breaker 15 be kept closed for thirty seconds, the carrier current control receivers disconnect all their associated loads from the power line 11.

In accordance with my invention, I provide means for maintaining the circuit breaker 15 closed for a time just sufficient to connect any desired number of carrier current controlled loads to the power line 11. In the case of the particular carrier current control receivers described above, if the circuit breaker 15 be kept closed for three seconds, very few of the carrier current control receivers connect their associated loads to the power line 11. If the circuit breaker 15 be kept closed for a slightly longer time, for example, three and one-half seconds, the carrier current control receivers connect a larger number of their associated loads to the power line. By controlling the length of time which the circuit breaker 15 remains closed, the amount of load added to the system by the carrier current control receivers is adjusted to any desired value.

If at any time it be desired to remove a portion of the carrier current controlled load from the power line 11, it is only necessary to maintain the circuit breaker 15 closed for thirty seconds in order to disconnect the entire carrier current controlled load from the system. Then, after a time sufficient to allow the carrier current control receivers to return to a responsive condition, the circuit breaker 15 may be kept closed for any desired length of time to connect any portion of the carrier current controlled load to the power line.

Such a control system may be utilized to maintain power demand substantially constant on a power system. In this specification and in the appended claims I use the expression "demand," or "power demand," on a power system to mean any quantity so measured in the system as to give an indication of the power delivered by the system to connected loads, such indication bearing some desired relation with the maximum power delivery capabilities of the system. For example, such demand may conveniently be measured by a meter responsive to current flowing in the system, which meter is so constructed as to be responsive only to current flowing for a substantial time.

Such a current meter, in which a thermal lag is provided to insure response of the meter only to current flowing for substantial periods, is described in Letters Patent No. 1,156,414, issued on October 12, 1915, to Paul M. Lincoln. It may be desired to use such a meter on certain power systems to indicate demand, because the maximum power delivering capability of a system is generally limited by the amount of heating produced in the generating equipment and associated circuits. The demand, as measured by the meter described in the above mentioned Lincoln patent, is closely related to this maximum power delivering capability.

Alternatively, the power demand on a power system utilizing my invention may be measured by an instrument which indicates a function of power flowing in the system, integrated in some desirable manner with respect to time. Such a demand meter is described in Letters Patent No. 1,156,412, issued on October 12, 1915, to Paul M. Lincoln. If such a meter be used, the demand on the system as measured by the meter is somewhat more closely related to the total system load.

In certain other situations it may be desired to utilize still another type of demand meter, commonly called a "block demand meter." This type of demand meter comprises a watt hour meter which is automatically reset to zero at the end of each "block," or predetermined period, and which indicates demand at the end of each such block, or period, according to the number of watt hours used in each such period. These periods may, for example, be a quarter or a half hour.

Any of these types of demand meters may be utilized in accordance with my invention to provide an indication by which an operator can control a carrier current system according to my invention, or to provide automatic operation of remote loads by carrier current control so as to maintain the total system load substantially constant. In providing such automatic operation according to my invention, the demand meter is provided with two sets of contacts, one set of contacts being closed when the demand is greater than a predetermined amount somewhat less than the total power delivering capability of the system, and the other set of contacts being closed when the demand is less than a predetermined smaller amount. If the last described "block" demand meter be utilized with this system, it can conveniently be arranged to operate only the first such contacts. The other set of contacts, which closes at a predetermined smaller demand, may be operated in response to the reduction of current in the power lines below a certain predetermined value.

In the drawings, a rectangle 18 represents such a demand meter which may be responsive to any desired function of the power delivering capability of the system. This meter 18 is energized from the power line 11 through current transformers 19 and potential transformers 20, and has a set of contacts 21 which are closed by an arm 22, made of conductive material, whenever the system demand is greater than a predetermined amount. The meter also has a second set of contacts 23 which are closed by the arm 22 whenever the system demand falls below a smaller predetermined value.

The contacts 21 and 23 of the demand meter 18 are provided to energize suitable circuits which automatically act to transmit carrier currents in such manner as to add load to the system, or remove load from the system, in such amounts as to keep the total system load substantially constant within certain limits. In certain situations it may not be desired to provide such a fully automatic system, and I have accordingly provided hand operating means for the system. Where the manual arrangement alone is desired, it is of course not necessary to provide the contacts 21 and 23 of the demand meter 18. When using the manual system, the operator determines when he wishes to remove load from the system or add load to the system by noting the position of the member 22 of the demand meter 18, or by any other suitable means.

In most cases, it will be desired to provide such hand operated means along with the fully automatic arrangement, and I have illustrated the fully automatic transmitting arrangement in Fig. 1 as including manual operating means for accomplishing the desired results. A double pole, triple throw switch 24 is provided which has one movable blade 25 connected to one terminal of the operating coil 27 of the circuit breaker 13, and another movable blade 26 connected to one terminal of the operating coil 28 of the circuit breaker 15. The other terminals of these operating coils 27 and 28 are both connected to one terminal 40 of a suitable source of operating potential, as, for example, one of the potential transformers 20. In the intermediate position of the switch 24, the movable blades 25 and 26 make no connection, and the system can be operated neither manually nor automatically. In the upper position of the switch 24, the movable blade 25 is connected to the other terminal 39 of the source of operating potential, and movable blade 26 is connected through a normally open push button 29 to terminal 39 of the source of operating potential.

When the system is not in operation, the parts are as illustrated in the drawings. In order to operate the system manually, an operator first moves the switch 24 to the upper position, thereby energizing the operating coil 27 of the circuit breaker 13 and starting the motor 12. After a short interval during which the motor 12 comes up to speed, the operator may depress the push button 29 to energize the operating coil 28 and close the circuit breaker 15, thereby energizing the power line 11 with carrier current from the generator 14. As explained above, because of the fact that carrier current receivers have certain manufacturing variations, and because operating voltage differs widely at different points along the power line 11, individual carrier current receivers operate at differing times. By maintaining push button 29 closed for a suitable time, the operator may connect any desired number of loads to the line 11, or disconnect any desired number of loads from the line.

A preferred method of operation is, however, as follows. If the operator maintains the push button 29 closed for a short period, for example, for a half second and then leaves it open for a somewhat longer period, for example 1½ seconds, and if he repeats such operation, he can operate the carrier current receivers much more slowly than by keeping button 29 depressed continuously. He may, in fact, by suitably choosing the ratio of the time when he holds the push button 29 depressed to the time when he leaves it undepressed, operate the carrier current receivers with any desired slowness, so that he may discontinue adding carrier current controlled loads to the system, or removing such loads from the system, whenever the indication of demand on the system justifies it.

In the control system for automatically controlling the transmission of carrier current pulses for increasing or decreasing the connection of remotely controlled loads in accordance with indications of the demand meter 18, there is a master relay 30, two double coil, two-position relays 31 and 32, time delay relays 33, 34, 35, and 36, and a time switch 37. The relay 30 controls removal of the carrier current controlled load from the system. The relay 31 prevents such loads from being removed while the demand meter 18 is causing their connection to the line 11. The second two-position relay 32 prevents the connection of such loads to the power line 11 while the demand meter 18 is causing the system to remove the remote loads from the line. The time delay relay 33 connects the generator 14 to the line 11 only after the motor 12 has come up to speed. The time delay relay 34 prevents the demand meter 18 from causing connection of the remote load to the line 11 before the carrier current receivers have returned to a suitable condition to receive control pulses after having received a set of such pulses. The time delay relay 35 prevents the system from transmitting pulses intended to connect remote loads to the system after all such loads have been connected. The time delay relay 36 prevents the system from transmitting additional pulses intended to disconnect remote loads from the system after all such remote loads have been disconnected. The time switch 37 is arranged to close and open a circuit alternately so as to transmit successive short pulses of carrier current in the process of connecting remote load to the power line 11.

To connect the system for fully automatic operation, the double pole, triple throw switch 24 is moved to its lower position. In this switch position, when the operating coil 41 is energized, a circuit is formed from one terminal 39 of the source of operating potential for the system through the contacts 38 of the master relay 30, movable blade 25, coil 27 and back to terminal 40 of the potential source and the circuit breaker 13 is operated to start the motor 12. When the arm 22 closes contacts 21 and contacts 42 of relay 31 are closed, the operating coil 41 of the master relay 30 is energized through a circuit extending from the terminal 40 of the source of operating potential through coil 41, contacts 21 and arm 20, and contacts 42 back to the terminal 39 of the source of operating potential.

When the system is in the condition illustrated, the carrier current controlled loads are all connected to the power line 11, and the contacts 43 of the two-position relay 32 are open to prevent useless operation of the system in attempting to connect additional remote loads to the line 11. The contacts 42 of the two-position relay 31 are closed to keep the system in readiness for transmitting a pulse of carrier current to disconnect loads whenever the contacts 21 of the demand meter 18 are closed by the arm 22 upon an increase in demand on the system.

When the demand on the system increases to an amount sufficient to move the arm 22 to closing position against the contacts 21 of the demand meter 18, a circuit is completed through coil 41 as explained above. As soon as the coil 41 of the master relay 30 is energized, the normally open contacts 38 close, thereby completing a circuit from the terminal 39 of the source of operating potential through the contacts 38, the movable blade 25 of the switch 24, and the operating coil 27 of the circuit breaker 13 to the other terminal 40 of the source of operating potential. The circuit breaker 13 is thereupon closed, and connects the motor 12 to the power line 11 so as to bring the motor generator set 12, 14 up to speed. A second pair of normally open contacts 44 of the master relay 30 simultaneously close, and "seal in" the operating coil 41 of the master relay 30 through a circuit from the terminal 39 of the potential source through the normally closed contacts 45 of the time delay relay 36, contacts 44 and operating coil 41 of the master relay 30 back to the other terminal 40 of the potential source.

Contacts 45 stay closed until all controlled loads are disconnected from the line 11 because the operating coil 46 of the time delay relay 36 is not energized until the circuit breaker 15 is closed, and this relay 36 is so constructed as to open its contacts 45 only after being energized for a period sufficiently long that transmitted carrier current has caused all carrier current receivers to disconnect their associated loads from the power line 11. In the case of the particular carrier current receivers described, this period may conveniently be about forty seconds. The master relay 40 thus remains closed for about forty seconds after being operated, even though the arm 22 moves away from the contacts 21 of the demand meter 18.

The contacts 38 of the master relay 30, upon being closed, also complete a circuit from the terminal 39 of the potential source through the operating coil 47 of the time delay relay 33 to the other terminal 40 of the potential source. This time delay relay 33 has contacts 48 which are normally open, and is arranged to close its contacts 48 only after the operating coil 47 has been energized for a period sufficient for the motor generator set 12, 14 to come up to speed. It is usually sufficient to allow about a five second interval for this operation.

After an interval sufficiently long for the motor generator set 12, 14 to come up to speed, the time delay relay 33 closes its contacts 48 and thereby completes a circuit from the terminal 39 of the potential source through the contacts 38 of the master relay 30, contacts 48 of the time delay relay 33, a pair of normally open contacts 49 of the master relay 30, the movable blade 26 of the switch 24, and the operating coil 28 of the circuit breaker 15 back to the other terminal 40 of the potential source. The normally open contacts 49 of the master relay 30 were closed previously upon the energization of the operating coil 41, so that closure of the contacts 48 results in operation of circuit breaker 15 and connection of the generator 14 to the power line 11 with the consequent transmission of a carrier current impulse.

When the contacts 48 of the time delay relay 33 close, another circuit is completed from the terminal 39 of the potential source through the contacts 38 of the master relay 30, contacts 48 of time delay relay 33, a pair of normally open contacts 50 of the master relay 30, and operating coils 51 and 52, in parallel, of the two-position relays 32 and 31, respectively, back to the other terminal 40 of the potential source. Energization of the operating coil 51 of relay 32 closes the contacts 43 and puts the system in readiness for transmitting carrier current pulses to the receivers to cause them to connect load to the system. Simultaneous energization of the operating coil 52 of the relay 31 opens the contacts 42, thereby opening the circuit through the contacts 21 of the demand meter 18 to prevent further operation of the system in transmitting carrier current to the receivers to cause them to disconnect loads from the system.

After these operations, the system continues the transmission of a carrier current impulse from the generator 14 for forty seconds, until the time delay relay 36 opens its contacts 45 and deenergizes the operating coil 41 of the master relay 30, thereby breaking all operating circuits, including the circuits through which the operating coils 27 and 28 of the circuit breakers 13 and 15 are energized. The motor generator set 12, 14 is therefore disconnected from the power line 11, the carrier current receivers have by such time disconnected all their associated loads from the power line 11, and the transmitter is in readiness to respond to a reduced demand on the power line by transmitting pulses to the carrier current receivers to cause them to add increments of load to the power line.

Either of two conditions may obtain after the above described operation has been completed. If the increased demand on the system which caused disconnection of loads therefrom was so great that, upon disconnecting all the carrier current controlled loads from the system, the arm 22 does not move to the left sufficiently to close a circuit through the contacts 23 of the demand meter 18, the control system remains inactive. However, if the demand on the system which caused load disconnection was smaller, removal of the carrier current controlled load from the system may be sufficient to make the arm 22 move to the left and close a circuit through the contacts 23.

In any case, the demand on the system must eventually become small enough so that the arm 22 closes the contacts 23. A circuit is thereupon completed from the terminal 39 of the potential source through the contacts 43 of the two-position relay 32 (which contacts were closed during the preceding load disconnecting operation), contacts 23 and arm 22 of demand meter 18, normally closed contacts 53 of master relay 30 (which is now deenergized), and operating coil 54 of time delay relay 34 back to the other terminal 40 of the potential source. The time delay relay 34 is so constructed that its normally open contacts 55 are closed only after its operating coil 54 has been energized for a substantial period, which may, for example, be as long as ten minutes.

The system is so arranged that closure of contacts 55 initiates operation of the system to connect the remote loads to the power line 11. Because of the long time delay provided for the time delay relay 34, brief decreases in demand on the power line 11 are not effective to initiate connection of the remote load thereto, even though the arm 22 touches briefly the contacts 23 of the demand meter 18. Unless the demand remains low enough to keep arm 22 against contacts 23 until relay 34 acts, the system does not add load to the power line.

The delay in the relay 34 also serves another purpose, namely, to prevent the transmission of carrier current pulses to the carrier current receivers immediately after they have received a pulse which has caused them to disconnect their associated loads from the power line 11. As explained hereinafter, the preferred type of carrier current receivers utilizes bimetal elements which depend on heating for their operation, and a short time should be provided after each operation of the bimetal elements to allow them to cool and return to a responsive condition. That is, if the arm 22 should move to the right in response to increased demand and touch contacts 21 to produce operation of the system to disconnect all remote carrier current controlled loads from the line 11, and immediately thereafter if the system demand should drop sufficiently to move the arm 22 to the left to close contacts 23, the time delay of the relay 34 assures that no carrier current is transmitted to the receivers until they are restored to a receptive condition for reconnecting loads to the line 11.

If, therefore, the decreased demand on the line 11 remains at a sufficiently low value to keep the arm 22 against the contacts 23 for a period longer than that for which the relay 34 is made to remain open, the contacts 55 close and complete a circuit from the terminal 39 of the potential source through the contacts 43 of relay 32, contacts 23 and arm 22 of demand meter 18, contacts 53 of the master relay 30, contacts 55 of the time delay relay 34, movable blade 25 of the switch 24, and operating coil 27 of the circuit breaker 13 back to the other terminal 40 of the potential source. The operating coils 56 and 47, of the time switch 37 and time delay relay 33 respectively, are connected in shunt to the operating coil 27 through the movable blade 25 of the switch 24, and are, therefore, energized at the same time through this circuit.

When the operating coil 27 is energized, it operates the circuit breaker 13 and starts the motor generator set 12, 14, and after a suitable interval the time delay relay 33 closes its contacts 48 to complete a circuit from the terminal 39 of the potential source through contacts 43 of relay 32, contacts 23 and arm 22 of demand meter 18, contacts 53 of master relay 30, contacts 55 of time delay relay 34, contact 48 of time delay relay 33, a pair of normally closed contacts 56' of the master relay 30 (which is now in unenergized position), and the operating coils 57 and 58, in parallel, of the relays 31 and 35, respectively, back to the other terminal 40 of the potential source. The operating coil 57 of the relay 31 closes the contacts 42 (which were left open after the preceding operation of the system in disconnecting all remote loads from the power line 11), so that closure of the contacts 21 of the demand meter 18 by the arm 22 can immediately initiate another load disconnecting operation.

After energization of the coil 58 of the time delay relay 35, the normally open contacts 59 of the relay close only after a period sufficiently long to insure that all carrier current controlled loads have been connected to the power line 11.

When the contacts 59 close after all such loads are connected, the operating coil 60 of the relay 32 is connected in parallel to the operating coils 57 and 58 of the relays 31 and 35, so that the contacts 43 of the relay 32 are opened, thereby opening the circuit including contacts 23 of demand meter 18, and preventing the system from sending any more carrier current pulses of the type which cause the carrier current receivers to connect loads to the power line 11. In this particular system, it is convenient to make the time delay of the relay 35 about thirty seconds, as will be explained hereinafter.

During the time when the contacts 23 are closed by the arm 22 of the demand meter 18, and the time delay relay 35 is moving toward the position where its contacts 59 are closed, the time switch 37 remains in operation. It is so constructed that, while its operating coil 56 is energized, it continually makes and breaks a circuit in shunt to the normally open contacts 49 of the master relay 30 (which is deenergized). The time switch 37 may be conveniently arranged, as shown, to have a movable arm 61 which is rotated by the operating coil 56 across a plurality of contacts 62 arranged in a circle, whose center is on the axis of rotation of the arm 61. The contacts 62 and the spaces therebetween may be proportioned in any desired manner to provide that repeated short pulses of carrier current are transmitted over the power line 11 with any desired spacing therebetween, so as to increase by any desired amount the total length of time required for the carrier current receivers to respond to such pulses in connecting their associated loads to supply line 11.

The circuit which is repeatedly completed and interrupted by time switch 37 as long as contacts 23 are closed may be traced from the terminal 39 of the potential source through contacts 43 of relay 32 (which contacts are not opened by the time delay relay 35 for 30 seconds), contacts 23 and arm 22 of demand meter 18, contacts 53 of master relay 30, contacts 55 of relay 34, contacts 48 of relay 33, contacts 62 and arm 61 of time switch 37, movable blade 26 of switch 24, and operating coil 28 of circuit breaker 15 back to the other terminal 40 of the potential source.

As long as the arm 22 remains against the contacts 23 (until contacts 59 of the time delay relay 35 close), the arm 61 of the time switch 37 repeatedly energizes and deenergizes the operating coil 28 of the circuit breaker 15, so as to connect and disconnect the generator 14 from the power line 11. This results, as long as the demand is sufficiently low, in a series of carrier current pulses being transmitted over the power line 11, and these pulses affect the carrier current receivers in the same manner as if a continuous pulse were transmitted, except that it takes a somewhat longer time to produce the same effect. For example, if the circuit breaker be closed for a half second and opened for one and one-half seconds, as previously suggested, such action being repeated by the time switch 37, it takes the carrier current receivers a little more than four times as long to connect their associated loads to the power line 11 as if a continuous carrier current pulse were transmitted. By thus slowing down the action of the carrier current receivers in connecting their associated loads, the demand meter 18 is made better able to respond to changes in demand on the power line 11 caused by connection of the remotely controlled loads to the line.

Now if the demand on the power line 11 continues to remain low and the arm 22 remains against the contacts 23, the carrier current receivers progressively connect more and more of their associated loads to the power line 11, and all such loads eventually become connected within about 25 seconds after contacts 48 of the relay 33 have closed. Thirty seconds after such closure, the contacts 59 of the relay 35 close to energize the operating coil 60 of the relay 32 and open contacts 43, thereby interrupting the circuit through the contacts 23 and preventing further transmission of short carrier current pulses. Such transmission is no longer desirable, because all the remote loads have been connected to the power line 11.

It may, however, happen that, as the carrier current receivers slowly connect their associated loads to the power line 11 in response to repeated closures of the circuit breaker 15, the demand on the power line 11 rises sufficiently to move the arm 22 from the contacts 23. At the moment of this opening all circuits through the control system are opened, including the circuits through the operating coils 27, 28, 54, 47, 56, 57, and 58. The motor generator set 12, 14 therefore stops, the time switch 37 stops, the time delay relays 33, 34 and 35 are released to their initial positions, and the remote loads which have so far been connected to the power line 11 remain connected thereto, while no more loads are added.

If the demand on the system thereafter increases to the point at which the arm 22 closes the contacts 21, the previously described operation is initiated, in which a long carrier current pulse is transmitted, and all the remote loads are disconnected from the power line 11. The load disconnecting circuit may be completed through contacts 21 because contacts 42 of relay 31 were closed immediately when loads were connected to line 11 after a preceding disconnecting operation.

It may happen that the demand does not thus increase but again decreases. Then, the arm 22 again touches the contacts 23 of the demand meter 18, and if the demand remains at a low value for a period long enough to close the contacts 55 of the ten minute delay relay 34, the entire sequence of operation begins anew to start the motor generator set 12, 14, and to connect additional loads to line 11. Such operation eventually causes additional carrier current receivers to connect their associated loads to the power line 11, thereby causing the demand to increase again. If this action be continued past the time when all the carrier current receivers have operated to connect their associated loads to the line 11, and long enough for the time delay relay 35 to close its contacts 59, as explained above, the operating coil 60 is energized and opens the contacts 43 of the relay 32, thereby disabling the contacts 23 of the demand meter 18 from completing a circuit through the control system to cause any further operation.

Although the automatic system has been described as having no means to disconnect loads progressively from the line, as it has means to connect such loads progressively to the line, such progressively disconnecting means may obviously be utilized, if desired. The progressive disconnecting means is exactly like the connecting means and transmits pulses effective to disconnect loads slowly from line 11. It is preferred at present to use the system as illustrated to avoid additional complication of parts and to retain certain advantages in connecting loads first at points of high system voltage. It is not necessary to decrease loads gradually because, as explained previously, less total load must be disconnected than must later be connected, and because loads are progressively connected to the line in any necessary amount almost immediately after their total disconnection, if such reconnection is necessary to maintain optimum demand on the line at all times within the capacity of the carrier controlled load to vary such demand.

As explained previously, the fact that different carrier control receivers connected to the power line 11 respond to carrier current impulses of different duration may be attributed, not only to the fact that there are manufacturing variations in the receivers, but also to the fact that the receivers are connected at points on the power line 11 where there are differing voltages. The differing voltages on the line may even be the principal factor in producing the varying response times of receivers. On some secondary feeders, for example, there may be voltages as low as 110 volts. On other secondary feeders, which are lightly loaded the voltage may be as high as 125 or 130 volts.

In short, carrier current receivers on high voltage feeders generally operate in shorter time than such receivers on low voltage feeders. A load connected at a high voltage point of a normal power transmission system generally produces less copper loss in transmission lines, distribution transformers and feeders than the same load would produce if connected at a low voltage point on the system. These facts are of considerable advantage in the operation of a carrier current control system according to my invention, because high voltage feeders generally can supply loads added to the power system with less transmission loss and better equipment utilization than low voltage feeders. This results not only in an improved load factor on distribution transformers and other equipment, but also in smaller copper loss in the power line 11 and the feeders which form a part thereof.

These advantages, which are related to the fact that carrier current receivers tend to operate first at high voltage points of the system, also accrue in a system in which the varying time of operation of receivers is caused by carrier voltage variations from point to point of the system. Carrier voltage variations generally correspond to power voltage variations. It is preferred, though, to utilize receivers in which the operating time is dependent on power voltage variations.

It is to be understood that it is within the scope of my invention to utilize any type of carrier current control receiver which responds only after receiving a carrier current for a substantial time. It is preferred, however, to use such a receiver which "resets" each time after it receives energy. That is, it is preferred to use a receiver which returns to a normal, or initial, starting condition within a short time after the reception of any carrier current impulse. Such receivers may be of the thermal type, in which a switch is operated through the medium of a bimetal strip to which heat is applied during the reception of a carrier current impulse. After an impulse is no longer received, the bimetal strip cools off and the receiver returns to its initial starting condition. This type of receiver is preferred because line surges, due to switching and the like, cannot cause it to operate.

As mentioned hereinbefore, a preferred type of carrier current receiver is described in Letters Patent No. 2,064,644 issued to me on December 15, 1936, and assigned to the same assignee as the present application. Such a receiver is illustrated in Fig. 2 of the drawings accompanying the present application, in which a portion of the power line 11 is illustrated. Several carrier current receivers, each shown as a rectangle 70, are connected to the line 11. One of these rectangles is formed by dashed lines, and includes a load device 71 connected to be energized from power line 11 through a power transformer 72 and a switch 73.

The switch 73 is of the liquid contact type and is completely described and claimed in Letters Patent No. 2,101,092, issued on December 7, 1937, to John H. Payne, Jr., and assigned to the same assignee as the present application. Briefly, the switch comprises a pair of metallic hemispheres separated by a disc of refractory material, and by a fillet of thermoplastic insulating material which is fusion welded to the rims of the disc and of the two hemispheres, thereby sealing the container thus formed. A body of liquid conducting material is sealed within the hemispheres and serves to make and break the electric circuit therebetween through an aperture in the disc of refractory material when the switch is moved between two operating positions.

Associated with each device 70 is means for storing the energy of the pulses sent out over the lines 11 until a predetermined value is reached, at which time the switch 73 will be operated. In other words, the energy of the transmitted pulses is stored for a time interval, the duration of which is a function of the amount of stored energy required to operate the device. In the illustrative form of my invention, the switch is thermally operated and has substantial heat-storage capacity. As previously explained, the different switches have different storage capacities so that the device will not be operated until there is transmitted an impulse of sufficient duration or a sufficient number of successive impulses to increase the stored energy, such as heat, in the storage means or device to the value necessary for operation. The switch 73 is carried by a yoke 74, pivoted on the free end of a supporting member 75, and actuated by the movable free end of a bimetallic member 76 to which heat is applied by an electric resistance heater 77. In the position shown, the switch 73 is in circuit interrupting position. Upon energization of the heater 77, the strip 76 bends to the right and allows the yoke 74 to move clockwise. Such movement of the yoke 74 turns the switch 73 into circuit completing position, and connects the load 71 to the power line 11 through the transformer 72. It is to be understood, of course, that the load 71, which is indicated as a lamp, may be any load on the power line 11 for which remote control is desired. As explained previously, particularly good results are obtained with a carrier current control system arranged in accordance with my invention when the load 71 is an electric water heater or the like load which acts to store energy.

Electric energy is applied to the heater 77 from a transformer 78, which is connected across the secondary of the transformer 72 through contacts 79 of an electromagnetic switch having an operating coil 80. A series resonant circuit including a condenser 81 and an inductance 82 is connected in shunt to the secondary of the transformer 72, and is tuned to the frequency of carrier current transmitted from the generator 14 of Fig. 1. A full wave rectifier circuit including rectifying means 83 is connected across the inductance 82, and is so arranged as to rectify carrier current flowing therethrough to produce a continuous current in the operating coil 80 of the electromagnetic switch.

In operation, when a carrier current impulse appears on the power line 11, it is transmitted through the transformer 72 and produces sufficient current flow through the series resonant circuit 81, 82, and through the operating coil 80 to close contacts 79 and transmit power current from the power line 11 to the heater 77. As explained above, when a small amount of heat, corresponding to a short impulse of carrier current, which, for example, lasts for three to six seconds, is applied by the heater 77 to the bimetallic strip 76, the strip moves to the right, thereby removing support from the right end of the yoke 74, and allowing it to move clockwise and close the switch 73.

If a longer carrier current impulse be transmitted over the power line 11, similar operations ensue, but the heater 77 applies a larger amount of heat to the bimetallic strip 76, so that it moves farther to the right and eventually engages the reset trigger 84, which is connected pivotally to the yoke 74. After the carrier current impulse has ended and heat is no longer supplied to the bimetallic strip 76, the strip moves to the left, and, through the medium of the trigger 84, pushes the yoke 74 back in counterclockwise rotation to interrupt the circuit through the switch 73. At the end of travel of the bimetallic strip 76, its upper end again rests under the end of the yoke 74 to maintain it in its counterclockwise position.

In Fig. 3, the thermally operated switch 73 with its associated operating parts is shown in somewhat greater detail. It is desirable in a thermal relay of this type that ambient temperature changes be prevented from effecting relative movement between the upper free end of the bimetallic strip 76 and the yoke 74. To this end the supporting member 75 is made of bimetallic material, so that its free end, which supports the yoke 74, moves in the same direction and in the same amount as the end of the bimetallic strip 76 in response to changes in ambient temperature.

Suitable adjusting means comprising a U-shaped member 85, a stiff resilient backing strip 86, and a screw 87, are provided for changing the relative positions of the free ends of the two bimetallic strips 75 and 76, thereby to change the energization period necessary to actuate the bimetallic strip 76 between its operating positions.

Manual control means are provided to operate the switch between its two positions for testing or other purposes. Such means comprise a pair of operating rods 88 and 89 which may conveniently extend outside the case of the thermal relay. When the operating rod 88 is pulled downward, it is arranged through the medium of a member 90, which is fastened to the bimetallic strip 75, to pull such strip to the left and release the yoke 74 from the upper free end of the bimetallic strip 76. Thereupon the switch 73 is turned to its circuit completing position. When the operating rod 89 is pulled downward it is arranged, through the medium of a spring 91, to pull the yoke 74 counterclockwise around the bimetallic strip 75 back to the circuit interrupting position of the switch 73.

It is apparent from the description of a power system arranged according to my invention with a carrier current control system providing accurate control of certain loads on the system, that an improved load factor may be obtained for the entire power system by connecting just enough of the controlled loads to the system at any time to keep power demand at an optimum value.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In a carrier current control system having a plurality of carrier current receivers of a type which operates to effect a desired control operation in response to reception of a carrier current pulse of substantial duration, the different receivers being operative to effect their respective control operations in response to reception of carrier current pulses of different durations, the method of operating any desired number of such receivers which comprises transmitting a succession of pulses of carrier current to said receivers, each of said pulses being shorter than the length required for operation of any of said receivers, the length of said pulses with respect to the length of periods without carrier current transmission between said pulses being sufficiently great to operate a desired number of said receivers after a number of such pulses is transmitted.

2. In a carrier current control system having a plurality of carrier current receivers of a type which operates to effect a desired control operation in response to reception of a carrier current pulse of substantial duration, the different receivers being operative to effect their respective control operations in response to pulses of such carrier current of different respective durations, the method of operating any desired number of such receivers which comprises transmitting to said receivers a carrier current pulse of sufficient duration to operate any desired number of said receivers after such pulse is transmitted.

3. In a carrier current control system having a plurality of carrier current receivers of a type which operates to effect a desired control operation in response to reception of a carrier current pulse of substantial duration, said receivers being operative in response to potentials on said system and being located at points of said system having different potentials, whereby, and by reason of unavoidable manufacturing variations, the different receivers are operative to effect their respective control operations in desponse to pulses of carrier current of different respective durations, the method of operating any desired number of such receivers which comprises transmitting to said receivers a carrier current pulse of sufficient duration to operate any desired number of said receivers after such pulse is transmitted 4. In combination, in a power transmission system having loads which may be disconnected from said system during peak demand thereon, means for individually controlling the connection of such loads to said power system, and means responsive to the demand on said system for controlling said connecting means to connect the associated loads progressively to said system as the demand on said system falls, thereby to improve the load factor of said system.

5. In combination, in a power transmission system having loads which may be disconnected from said system during periods of maximum demand thereon, means for individually controlling the connection and disconnection of such loads from said system, means responsive to the demand on said system for operating said connecting means to disconnect said loads from said system upon an increase in the demand thereon, and means responsive to decreasing demand on said system for connecting said loads to said system progressively as the demand thereon decreases, whereby the load factor of said system is improved.

6. In combination, in a power transmission system having loads which may be disconnected from said system during periods of maximum demand thereon, a carrier current control system associated with said transmission system and comprising carrier current receiving means associated with each of said loads for controlling individually the connection of said loads to said system, each of said receiving means being effective to produce a control operation only after reception of a carrier current impulse of different duration, and means responsive to demand on said system for transmitting carrier current to said receiving means to effect progressive connection of said loads to said system as the demand on said system decreases.

7. In combination, in a power transmission system having loads which may be disconnected therefrom during periods of high demand thereon, means for controlling individually the connection of such loads to said system in response to the reception of carrier current for a substantial time, each of said means being effective to produce a control operation upon reception of carrier current for a different time, and means responsive to changing demand on said system for transmitting carrier current thereover to said controlling means, said transmitting means being operative to transmit carrier current only until said controlling means have effected changes in the connection of a portion of the loads on said system such that the resulting demand on said system conforms to a predetermined desired demand.

8. In combination, in a power transmission system having loads which may be disconnected therefrom during periods of high demand thereon, means for controlling individually the connection of such loads to said system in response to the reception of carrier current for a substantial time, each of said controlling means being effective to connect the associated load to said system upon reception of carrier current for a different time, and means responsive to decreasing demand on said system for transmitting successive short impulses of carrier current to said controlling means only until a portion of said controlling means has operated to connect a sufficient number of loads to said system to increase the demand thereon to a predetermined value, the length of such short successive impulses of carrier current being sufficient with respect to the length of intervals therebetween to operate said controlling means after reception of a number of such short pulses.

9. In combination, in a power transmission system having loads which may be disconnected therefrom during periods of high demand thereon, means for effecting individually the connection of said loads to said system in response to the reception of carrier current for a substantial time, each of said means being effective only in response to carrier current of a different time, and means responsive to demand on said system for transmitting carrier current to said connecting means whenever such demand falls below a predetermined value thereby to cause progressive connection of said loads to said system, said transmitting means being effective to stop transmission of carrier current to said controlling means and thereby to stop such progressive connection of said loads to said system whenever the demand on said system rises above said predetermined value.

10. In a power transmission system having loads which may be disconnected therefrom during periods of high demand thereon, means responsive jointly to system voltage and to carrier current transmitted through said system for connecting such loads to said system, said controlling means being connected to said system at points of differing system voltage thereby to cause fast operation of said controlling means at points of high voltage and slow operation of said controlling means at points of low voltage, and means responsive to decreasing demand on said system for transmitting carrier current over said system to said controlling means to effect progressive individual connection of said loads to said system, said controlling means at said high voltage points being automatically first selected for operation in response to such transmitted carrier current, whereby loads are first connected to said system at high voltage portions thereof.

11. In a remote control system having a plurality of devices of which any desired number is to be operated, means to supply control pulses to said devices, each of said devices having means to store the energy of said pulses for an interval whose duration is a function of the amount of stored energy and to operate the respective device when energy stored in the corresponding storage means attains a predetermined value, said predetermined value being different in the different devices, the method of operating any desired number of such devices which comprises supplying to all of said devices a succession of control pulses spaced in time by less than said interval, the succession including a number of pulses sufficient to increase the stored energy in the respective storage means to a value as great as that value of energy storage required to operate the desired number of devices.

12. In a remote control system having a plurality of devices of which any desired number is to be operated, means to supply current to said devices, each of said devices having means to store the energy of said current and operate the respective device when energy stored in the corresponding storage means attains a predetermined value, said predetermined value being different in the different devices, the method of operating any desired number of such devices which comprises supplying current to all of said devices for a time sufficient to increase the stored energy in the respective storage means to a value as great as that value of energy storage required to operate the desired number of devices.

13. In a distribution system having a plurality of loads connected thereto through respective switches, individual control means for operating said switches, each of said control means being operative in response either to continuous energization for a predetermined period or to intermittent energization for a longer period to operate the respective switch, said predetermined period and said longer period being different for the different switches, the method of operating any desired number of said switches to control the connection of any desired number of said loads from said system, which method comprises supplying to all of said control means successive pulses of sufficient number to cause operation of a desired number less than all of said switches.

14. In a remote control system having a plurality of remotely controlled switches operated in response to pulses received from a common point, each of said switches having means associated therewith to store the energy of said pulses for an interval whose duration is a function of the amount of stored energy and to operate the respective switch to one position when said stored energy exceeds a certain predetermined value and to the other position when said energy exceeds a different value, said predetermined values being unavoidably different in the different means, the method of operating any desired number of such switches which comprises supplying to all of said means a succession of pulses spaced apart in time by less than said interval, the number of pulses being determined in accordance with the number of said switches to be operated.

15. In a remote control system for a plurality of loads on a power system from which such loads may be disconnected during periods of peak demand, each of said loads being connected to or disconnected from said power system by a thermally actuated switch, each of said switches having substantial heat storage capacity whereby actuation thereof is delayed for a substantial time after a control impulse is applied to such switch, the different switches being responsive to such control impulses of different durations to connect or disconnect the associated loads, the method of adjusting the number of such loads connected to said power systems which comprises transmitting a control pulse to all of said thermally actuated switches of such duration that a desired number less than all of said switches are actuated.

JOHN L. WOODWORTH.

CERTIFICATE OF CORRECTION.

Patent No. 2,297,380.  September 29, 1942.

JOHN L. WOODWORTH.

It is hereby certified that error appears in the printed specification of the above numbered patent requiring correction as follows: Page 8, second column, line 39, claim 1, before "number" insert --corresponding--; line 63, claim 3, for "desponse" read --response--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.